US007803042B2

(12) United States Patent
Shuster

(10) Patent No.: US 7,803,042 B2
(45) Date of Patent: Sep. 28, 2010

(54) CARD GAME WITH COMMON CARD REMOVAL

(76) Inventor: Gary Stephen Shuster, P.O. Box 11289, Zephr Cove, NV (US) 89448

( * ) Notice: Subject to any disclaimer, the term of this patent is extended or adjusted under 35 U.S.C. 154(b) by 925 days.

(21) Appl. No.: 11/624,159

(22) Filed: Jan. 17, 2007

(65) Prior Publication Data

US 2008/0171591 A1 Jul. 17, 2008

(51) Int. Cl.
*A63F 9/24* (2006.01)
*A63F 13/00* (2006.01)

(52) U.S. Cl. .......................................... 463/13; 463/16

(58) Field of Classification Search ............. 463/12–13, 463/16–20; 273/138.1, 139, 292
See application file for complete search history.

(56) References Cited

U.S. PATENT DOCUMENTS 6,132,311 A * 10/2000 Williams ..................... 463/13
2004/0242297 A1 * 12/2004 Walker et al. ................. 463/13

* cited by examiner

*Primary Examiner*—Peter D. Vo
*Assistant Examiner*—Jasson H Yoo
(74) *Attorney, Agent, or Firm*—Connolly Bove Lodge & Hutz LLP; Jonathan A. Jaech

(57) ABSTRACT

A method of managing a card game, a computer implementation thereof, and a card game kit, according to which a hand of cards is dealt to each of a plurality of players. Each hand includes one or more cards, and each card bears a designated value and suit. A plurality of common cards are dealt into a common card zone, and all players know the designated value and suit of each common card. The players then have the option of placing a wager or withdrawing from the game, after the hands and common cards have been dealt. For those players remaining in the game, at least one common card is removed from the common card zone and wagering or withdrawing continues until a winner is determined based at lest in part on remaining cards in the common card zone.

5 Claims, 2 Drawing Sheets

CARD GAME WITH COMMON CARD REMOVAL

BACKGROUND OF THE INVENTION

1. Field of the Invention

The field of the present invention is card games.

2. Background

Numerous card games are known in the art, many of which are played with multiple players in competition against one another. In these various games, one or more decks of playing cards are shuffled and dealt to the players. Each player plays using the cards that are randomly dealt to each respective player. The outcome of such games is not determined by luck alone, but also involves an element of skill on the part of the players. For example, card games such as bridge, poker, pinochle, and other such games are generally recognized as involving both luck and skill in competitive game play. While some of these games have been around for may years in their current form, new games, and even new variations on old games, are always needed as players' skills and tastes change over time.

SUMMARY OF THE INVENTION

The present invention is directed toward a method of managing a card game, a computer implementation thereof, and a card game kit. In the method, hand of cars is dealt to each of a plurality of players. Each card bears a designated value and suit, and the value and suit of the cards held by one player is unknown to each of the other players. A plurality of common cards is then dealt to a common card zone, such that all players know the designated value and suit of each common card. Each player is then given the option to place a wager or withdraw from the game based upon at least the hand of each respective player in combination with the common cards in the common card zone. Next, at least one common card is removed from the common card zone. Play may continue by giving the players additional opportunities to wager of withdraw and by removing additional common cards from the common card zone. Cards to be removed from the common zone should be selected and removed in a manner that does not permit players to predict in advance which card or cards are to be removed. Cards may be removed one per round, or any other number of cards may be removed for each round of play.

In the computer-implemented method, an electronic card game interface is served to a plurality of players. The interface may be served to at least one of the players using a network. A hand of cards is allocated to each of the plurality of players in a computer memory. Each hand includes one or more simulated cards form a simulated deck of cards, and each simulated card is assigned a designated value and suit. The designated value and suit of each simulated card in the hand of one player is unknown to each of the other players. A plurality of simulated common cards are also allocated from the simulated deck. The designated value and suit of each simulated common card is viewable within a common card zone of the game interface. Each player is given the opportunity to place a wager or withdraw from the game based upon at least the hand of each respective player in combination with the simulated common cards viewable in the common card zone. Next, at least one simulated common card is removed from the common card zone. The method for selecting the card to be withdrawn should be configured such that players cannot predict in advance which card or cards are to be removed. For example, cards to be withdrawn may be randomly selected. Play may continue by giving the players additional opportunities to wager or withdraw and by removing additional simulated common cards from the common card zone.

The card game kit comprises a plurality of playing cards, each bearing a designated value and suit, and instructions which include rules to a card game. The rules describe playing the card game as a series of steps. Initially, a hand of cards is dealt to each of a plurality of players. Each hand includes one or more cards, and the value and suit of the cards held by one player is unknown to each of the other players. A plurality of common cards is dealt into a common card zone, with each player knowing the value and suit of each of the common cards. The players are then allowed to wager of withdraw from the game based upon at least the hand of each respective player in combination with the common cards in the common card zone. Next, at least one common card is removed from the common card zone. Play may continue by giving the players additional opportunities to wager or withdraw and by removing additional common cards from the common card zone.

Accordingly, an improved method of managing a card game, a computer implementation thereof, and a card game kit are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
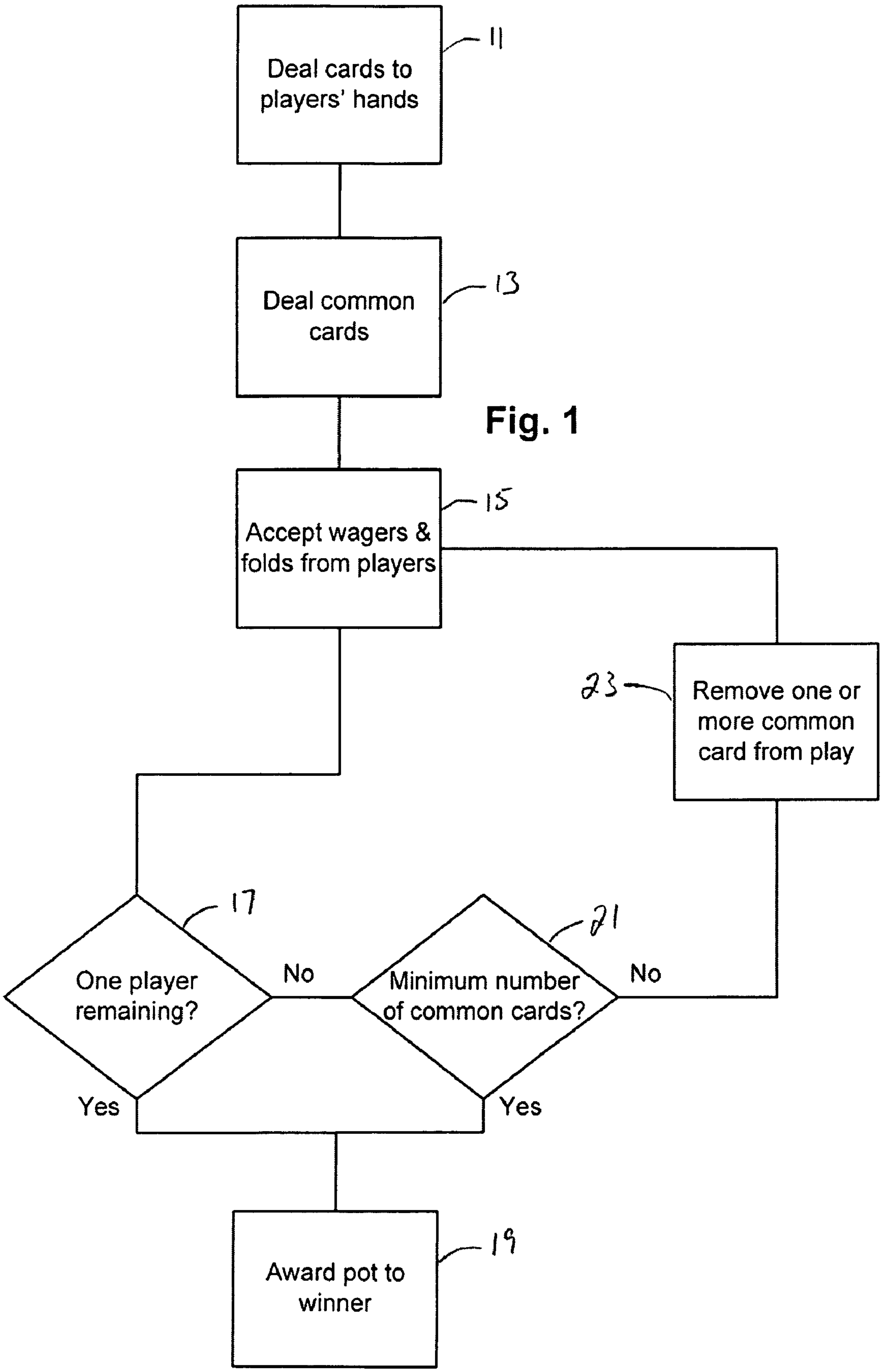
FIG. 1 is a flowchart illustrating a process for managing a card game.

Turning in detail to the drawings, FIG. 1 is a flowchart showing a process for managing a card game. Initially, each player in the game is dealt a hand of cards 11 from a deck of playing cards. The cards may be of any type, but for simplicity, the remainder of the description below refers to a standard deck of playing cards of the type commonly used in the various incarnations of poker. The number of cards in each hand may vary from one to many, with the number generally depending upon other game rules agreed to by the players. For example, the players may agree to play the card game in a manner similar to the poker game "Texas Hold 'Em", in which case each players' hand consists of two cards. The game play of other card games may also be followed by incorporating the process described below.

After each player has been dealt a hand 11, then a plurality of common cards are dealt into a common card zone 13. Preferably, at least ten common cards are dealt, although the number of common cards may be any amount selected by the players in advance of game play, limited only by the number of cards in the deck or decks, if multiple decks are used. The common card zone may be as simple an area on a card table or a computer display into which the common cards are placed. The common card zone need not be a single, contiguous area.

Following the dealing of the common cards, players are invited to place a wager or fold 15 and withdraw from the game. Alternatively, an opportunity may be provided to the players to place a wager or withdraw prior to the time the common cards are dealt. Each players' wagers may be made using information, including at least the combination of cards held in that player's hand in combination with the common cards in the common card zone. However, none of the players should know which cards are to be removed from the common card zone in subsequent rounds. Also, where two or more players remain tin the game, the outcome of the game is not determined until no more cards are to be removed from the common card zone, which should occur in the final round. Where the card game proceeds in a manner similar to a poker game, the wagering and folding options for players may also proceed according to the rules of the particular poker game. Alternatively, the players may set their own rules for wagering and folding.

Following wagering in the first round, if there is one player remaining in the game 17, then that player is declared the winner and is awarded the accumulated wagers 19. While more than one player remains in the game 17, game play continues unless a minimum number of common cards remain in the common card zone 21. During game play, at least one common card is removed from the common card zone 23. The common card, or cards, removed from the common card zone is preferably randomly or quasi-randomly selected, and the dealer or any of the players may participate in the selection. For example, the common card to be removed may be chosen by rolling one or more dice, or they may be chosen by drawing a card from a second deck of cards. In a computer implementation, a random number generator, such as those known in the art for generating quasi-random numbers, may be used to select the cards to be removed. Once one or more common cards have been removed from the common card zone, the players are invited to place additional wagers or withdraw from the game. As before, wagers may be based upon at least the combination of cards held in that player's hand in combination with the common cards which are in the common card zone.

It should be appreciated that removing cards from a common set, leaving remaining cards in the set, has exactly the same effect as selecting the remaining cards. Therefore, whether cards are removed thereby leaving common cards remaining, or whether common cards are selected thereby taking the remainder of cards out of play, makes no difference according to the invention. As used herein, to "remove" is intended to encompass both operations, in which some cards are designated as remaining in play, and other cards are designated as taken out of play.

Once the minimum number of common cards in the common card zone is reached 21, game play is halted, and the player with the best hand in combination with the remaining common cards in the common card zone is declared the winner. That player is awarded the accumulated wager 19. Preferably, game play is stopped when five common cards remain in the common card zone, although the minimum number of common cards may be any amount selected by the players in advance of game play.

In an alternative embodiment, players may compete in an auxiliary game of chance to determine who will be permitted to select a card for removal from the common card zone. For example, players may compete in a game of dice, spin a gaming wheel, or play any other game of chance. In effect, one of the players may be randomly selected to withdraw one or more of the cards from the common zone. The winning player of the auxiliary game is then permitted to select a card, at the winning player's discretion, from the common card zone. The auxiliary game may be played before of after wagering in the primary game takes place. Optionally, each player who wins an auxiliary game may be prevented from participating in the auxiliary games in subsequent rounds of the same hand. Also optionally, an auxiliary game may be combined with random selection method. For example, the auxiliary game may be played in early rounds, while in later rounds a random method is used to select the card or cards to be withdrawn.

The method of the invention may be used for various card games. In an embodiment of the invention, the method is used to play a variant of Texas Hold 'Em, as illustrated by the following example. Essentially, each player is dealt two cards. There is a round of betting. Then, some number of cards, for example, ten, is "flopped" (i.e., dealt as common cards). Another betting round takes place. In three more rounds, five of the remaining ten cards are removed from the flop. This way, for example, a player with 10D JD might see 9D QD KD AD AH KH 2C 2S QS on the board. This player will know that if only 3 of the 4 diamonds on the board are not removed, he will hold a flush; conversely, without those cards, he is more likely to lose. Continuing the example, suppose 9D QS and KH are removed in the first round. The player now knows that unless QD, KD, or AD are removed, he will hold a royal flush. If any one of these cards is removed, he will hold a Jack high hand. In the next round, another card may be removed. After another round of betting, a final card would then be removed. This example illustrates how the method of game play may give players the thrill of seeing possibilities for hands that are extremely rare in normal Hold 'Em.

Figure 2:
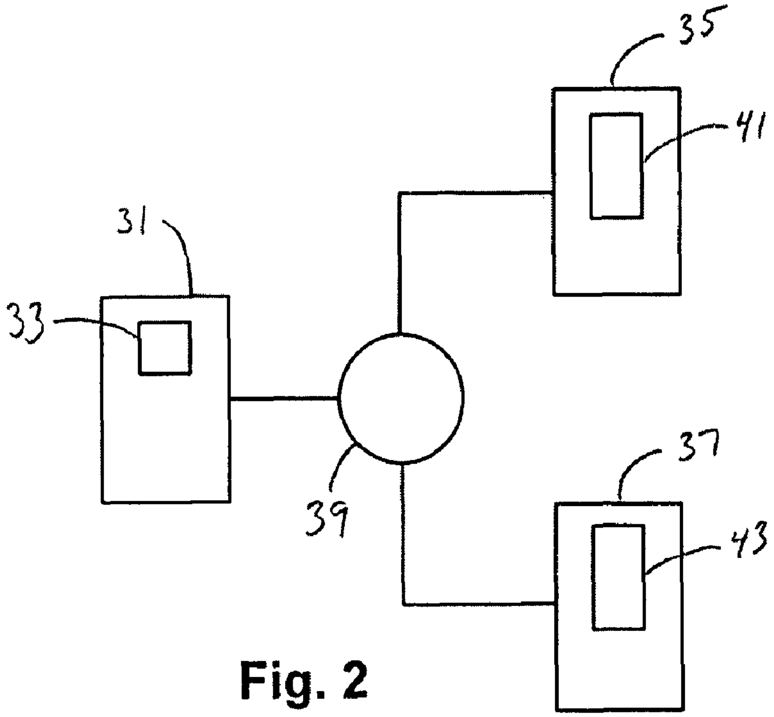
FIG. 2 schematically illustrates a computer network over which a card game may be played.

The method of managing a card game described above may be implemented using a single computer, or using multiple computers connected over a local area network or a wide area network. The single computer configuration is best suited for use by a single human player who plays against one or more computer-generated player representations, i.e., simulated players, although a single computer, multi-human player configuration is possible. FIG. 2 shows a multiple computer configuration which includes a host computer 31 which runs processes using a memory 33 for the simulated game. The players interact with the host computer 31 through other computers 35, 37 connected to the host computer 31 over a network 39. Each of the player computers 35, 37 includes a player interface 41, 43 for displaying the card game to each respective human player, the display showing the cards in that player's hand and the cards in the common card zone. Optionally, the host computer may also include a player interface for use by one of the players. Each of the networked computers includes an input device (not shown), e.g., keyboard, mouse, touch-screen display, and the like, which allows the player to interact with the processes of the simulate game.

In the computer implemented card game, the simulated game processes allocate simulated cards from a simulated deck to each of the players according to the rules of the card game as discusses above in connection with FIG. 1. The simulated deck is preferably a representation of a standard deck of playing cards for poker, although any suitable simulated deck of cards may be used. As the simulated card game proceeds, the players interact with the simulated game processes to place wagers or withdraw from the game as desired, until one of the players wins and is awarded the accumulated wagers.

Figure 3:
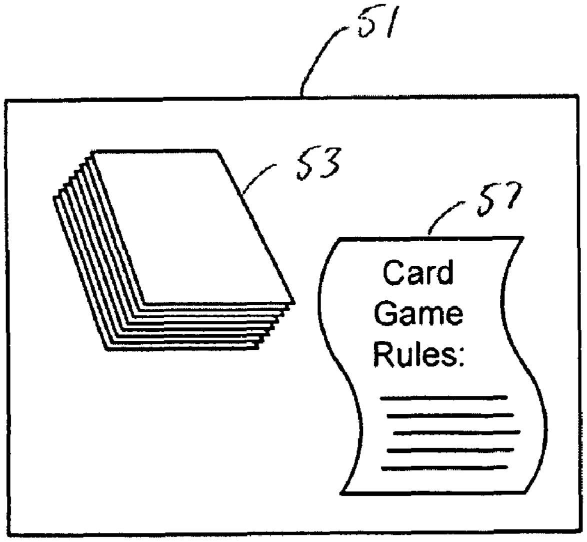
FIG. 3 illustrates a card game kit.

FIG. 3 shows a card game kit 51 which includes a deck of cards 53 and instructions 55. The deck of cards 53 is preferably a standard deck of playing cards for poker, although any suitable deck of cards may be used. The instructions 55 provide the rules of game play as discussed above in connection with FIG. 1.

Thus, a method of managing a card game, a computer implementation thereof, and a card game kit are disclosed.

While embodiments of this invention have been shown and described, it will be apparent to those skilled in the art that many more modifications are possible without departing from the invention concepts herein. The invention, therefore, is not to be restricted except in the spirit of the following claims.

What is claimed is:

1. A computer-generated method for playing a card game, the method comprising the steps of:

dealing a computer simulated hand of cards to each of a plurality of players in a computer memory, wherein each hand of cards includes one or more computer simulated cards from a computer simulated deck of cards, each simulated card is assigned a designated value and suit, and the designated value and suit of each simulated card in the hand of a first player is unknown to each of the other players;

dealing at least ten computer simulated common cards from the simulated deck of cards, wherein the designated value and suit of each simulated common card is viewable by each player within a common card zone of an electronic game interface;

accepting from each player one of a wager or withdrawal from the game after the hands of cards and the plurality of common cards are dealt;

removing at least one computer simulated common card from the common card zone after the accepting step to determine a winner based at least in part on remaining computer simulated cards in the common card zone; and repeating the accepting and removing steps until the winner is determined and until no more than five simulated common cards remain viewable in the common card zone.

2. The method of claim 1, further comprising serving the electronic card game interface to the plurality of players over a network, the computer memory being operatively connected to the network.

3. The method of claim 1, wherein removing the at least one simulated common card includes randomly selecting the at least one simulated common card for removal.

4. The method of claim 1, wherein removing the at least one common card includes randomly selecting a player to choose the at least one common card for removal.

5. The method of claim 1, wherein at least one of the players comprises a computer-generated player representation.

* * * * *